United States Patent
Chiu (10) Patent No.: US 11,914,809 B2
(45) Date of Patent: Feb. 27, 2024

(54) ILLUMINATED TRACKPAD

(71) Applicant: Chicony Power Technology Co., Ltd., New Taipei (TW)

(72) Inventor: Chen-Hao Chiu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/049,625

(22) Filed: Oct. 25, 2022

(65) Prior Publication Data

US 2024/0028149 A1 Jan. 25, 2024

Related U.S. Application Data

(60) Provisional application No. 63/390,749, filed on Jul. 20, 2022.

(30) Foreign Application Priority Data

Oct. 5, 2022 (TW) .................................. 111137890

(51) Int. Cl.
G06F 3/041 (2006.01)
G09G 3/06 (2006.01)
(Continued)

(52) U.S. Cl.
CPC ........ G06F 3/0416 (2013.01); G06F 3/03547 (2013.01); G06F 3/0412 (2013.01);
(Continued)

(58) Field of Classification Search
CPC .. G06F 3/0416; G06F 3/03547; G06F 3/0412; G06F 3/0488; G06F 2203/04107;
(Continued)

(56) References Cited

U.S. PATENT DOCUMENTS

| | | | |
|---|---|---|---|
| 9,235,306 B2 | 1/2016 | Lubert et al. | |
| 2014/0192013 A1* | 7/2014 | Lubert | G06F 3/044 345/174 |
| 2020/0301523 A1 | 9/2020 | Ho et al. | |

FOREIGN PATENT DOCUMENTS

| | | |
|---|---|---|
| CN | 206460433 U | 9/2017 |
| CN | 206973492 U | 2/2018 |

(Continued)

*Primary Examiner* — Yaron Cohen
(74) *Attorney, Agent, or Firm* — CKC & Partners Co., LLC (57) ABSTRACT

An illuminated trackpad includes a substrate, a light guide plate disposed under the substrate, a circuit board disposed under the light guide plate, and light-emitting elements disposed on the circuit board. The light guide plate includes light guide units and through holes. Each light guide unit is composed of light guide microstructures and substantially in the shape of a strip or a line. The through holes are respectively arranged on one side of the light guide units. The circuit board has a touch surface and a non-touch surface. The touch surface has a touch area on which sensing electrodes are disposed. The light-emitting elements are respectively accommodated in the through holes. After entering the light guide plate through inner walls of the through holes, the lights emitted by the light-emitting elements are guided upward through the light guide units to pass through the substrate and exit.

19 Claims, 9 Drawing Sheets

(51) Int. Cl.
  *G06F 3/0354*    (2013.01)
  *G06F 3/0488*    (2022.01)
(52) U.S. Cl.
  CPC ............. *G09G 3/06* (2013.01); *G06F 3/0488* (2013.01); *G06F 2203/04107* (2013.01); *G09G 2320/0626* (2013.01); *G09G 2354/00* (2013.01)
(58) Field of Classification Search
  CPC ............. G09G 3/06; G09G 2320/0626; G09G 2354/00
  See application file for complete search history.

(56)    References Cited

FOREIGN PATENT DOCUMENTS

| | | | |
|---|---|---|---|
| CN | 111801723 | A | 10/2020 |
| CN | 211857435 | U | 11/2020 |
| CN | 112306264 | A | 2/2021 |
| CN | 112534386 | A | 3/2021 |
| CN | 213934848 | U | 8/2021 |
| CN | 113778260 | A | 12/2021 |
| CN | 114341966 | A | 4/2022 |
| TW | I669647 | B | 8/2019 |
| TW | I690840 | B | 4/2020 |
| TW | 202109935 | A | 3/2021 |
| TW | I749713 | B | 12/2021 |
| TW | I753769 | B | 1/2022 |

\* cited by examiner

ILLUMINATED TRACKPAD

CROSS-REFERENCE TO RELATED APPLICATION

This application claims priority to U.S. Provisional Application Ser. No. 63/390,749 filed Jul. 20, 2022, and Taiwan Application Serial Number 111137890, filed Oct. 5, 2022, the disclosures of which are incorporated herein by reference in their entireties.

BACKGROUND

Technical Field

The present disclosure relates to an illuminated trackpad.

Description of Related Art

The appearances of traditional touchpad devices are usually monotonous and dull, so computer peripheral manufacturers have developed illuminated touchpad devices with excellent visual effects. The backlight assemblies used in the traditional touchpad devices are composed of two parts, which are the light-shielding layer and light guide plate from top to bottom.

As functionality continues to increase, so does the sophistication of the markings on the touchpad device. If the button icons share the same light guide plate, a single button icon cannot be displayed or marked independently. In other words, the light-emitting pattern presented by the same light guide plate cannot be changed.

Accordingly, how to provide an illuminated trackpad to solve the aforementioned problems becomes an important issue to be solved by those in the industry.

SUMMARY

An aspect of the disclosure is to provide an illuminated trackpad that can efficiently solve the aforementioned problems.

According to an embodiment of the disclosure, an illuminated trackpad includes a substrate, a light guide plate, a circuit board, and a plurality of light-emitting elements. The light guide plate is disposed under the substrate and includes a plurality of light guide units and a plurality of through holes. Each of the light guide units is composed of a plurality of light guide microstructures and substantially in shape of a strip or a line. The through holes are respectively arranged on one side of the light guide units. The circuit board is disposed under the light guide plate. The circuit board has a touch surface and a non-touch surface. The touch surface has a touch area. A plurality of sensing electrodes are disposed on the touch area. The light-emitting elements are disposed on the circuit board and respectively accommodated in the through holes. After lights emitted by the light-emitting elements enter the light guide plate through inner walls of the through holes, the lights are guided upward by the light guide units to pass through the substrate and exit.

In an embodiment of the disclosure, each of the light-emitting elements is disposed among the sensing electrodes. Each of the light-emitting elements and each of the sensing electrodes are spaced apart by a distance.

In an embodiment of the disclosure, the illuminated trackpad further includes a light-shielding layer that is opaque. The light-shielding layer is disposed between the substrate and the light guide plate. The light-shielding layer has a plurality of light-transmitting regions. The light-transmitting regions are disposed corresponding to the light guide units, respectively.

In an embodiment of the disclosure, the light-shielding layer has at least one non-light-transmitting region. The at least one non-light-transmitting region is disposed corresponding to the light-emitting elements.

In an embodiment of the disclosure, a blocking wall that is opaque is between any adjacent two of the light-emitting elements.

In an embodiment of the disclosure, the light guide plate further includes an accommodating groove. The blocking wall is accommodated in the accommodating groove.

In an embodiment of the disclosure, a light blocking structure is further disposed in the light guide plate and between any adjacent two of the through holes.

In an embodiment of the disclosure, the light blocking structure is a laser engraving structure.

In an embodiment of the disclosure, any adjacent two of the light guide units are separated from each other.

In an embodiment of the disclosure, the light guide units form an outer frame substantially presenting a light guide graphic with a rectangular top portion and a U-shaped bottom portion. A number of the light guide units included in the light guide graphic is at least seven.

In an embodiment of the disclosure, at least seven of the light-emitting elements form a light-emitting element group. The light-emitting elements in the light-emitting element group respectively correspond to the light guide units in the light guide graphic.

In an embodiment of the disclosure, the circuit board includes a controller. The controller is configured to generate a signal for controlling each of the light-emitting elements in the light-emitting element group to emit light or not to emit light, so that the light guide graphic presents a number. The number is one of 0 to 9.

In an embodiment of the disclosure, the controller is further configured to sense a touch input through the sensing electrodes, and configured to change the number presented by the light guide graphic in response to the touch input moving from a first position to a second position on the touch area.

In an embodiment of the disclosure, the circuit board includes a controller. The controller is configured to generate a signal for controlling each of the light-emitting elements in the light-emitting element group to emit light or not to emit light, so that the light guide graphic presents an English letter. The English letter is one of A to Z.

In an embodiment of the disclosure, the controller is further configured to sense a touch input through the sensing electrodes, and configured to change the English letter presented by the light guide graphic in response to the touch input moving from a first position to a second position on the touch area.

In an embodiment of the disclosure, the sensing electrodes are distributed on the touch area in a matrix form, so that the sensing electrodes correspond to independent coordinates respectively.

In an embodiment of the disclosure, the sensing electrodes and the light-emitting elements are arranged in the touch area.

In an embodiment of the disclosure, the circuit board has a plurality of via holes. The sensing electrodes are electrically connected to a controller on the non-touch surface through the via holes.

In an embodiment of the disclosure, the controller is further configured to sense a touch input through the sensing electrodes, and configured to change a brightness of the light emitted by at least one of the light-emitting elements in response to the touch input moving from a first position to a second position on the touch area.

According to an embodiment of the disclosure, an illuminated trackpad includes a substrate, a light guide plate, a circuit board, and a plurality of light-emitting elements. The light guide plate is disposed under the substrate and includes a plurality of light guide units and a plurality of through holes. Each of the light guide units is composed of a plurality of light guide microstructures and substantially in shape of a strip or a line. The through holes are respectively arranged on one side of the light guide units. The circuit board is disposed under the light guide plate. A plurality of sensing electrodes are disposed on the circuit board. The plurality of light-emitting elements are disposed on the circuit board and respectively accommodated in the through holes. The light-emitting elements are configured to emit lights toward inner walls of the through holes, respectively. The light guide units are configured to guide the lights in the light guide plate toward the substrate.

Accordingly, in the illuminated trackpad of the present disclosure, one side of each of the light guide units of the light guide plate is provided with a corresponding through hole, and each of the through holes is provided with a corresponding light-emitting element therein. Therefore, the light emitted by each of the light-emitting elements can enter the light guide plate through the inner wall of the corresponding through hole, and then be guided upward by the corresponding light guide unit to pass through the substrate and exit. With this configuration, by individually controlling each of the light-emitting elements to emit light or not to emit light, the light guide graphic composed of the light guide units can present a variable pattern (e.g., different numbers or English letters). In addition, the illuminated trackpad of the present disclosure can also use the sensing electrodes disposed on the circuit board to sense the touch input of a user, and change the pattern or brightness of the light guide graphic according to the movement path of the touch input.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
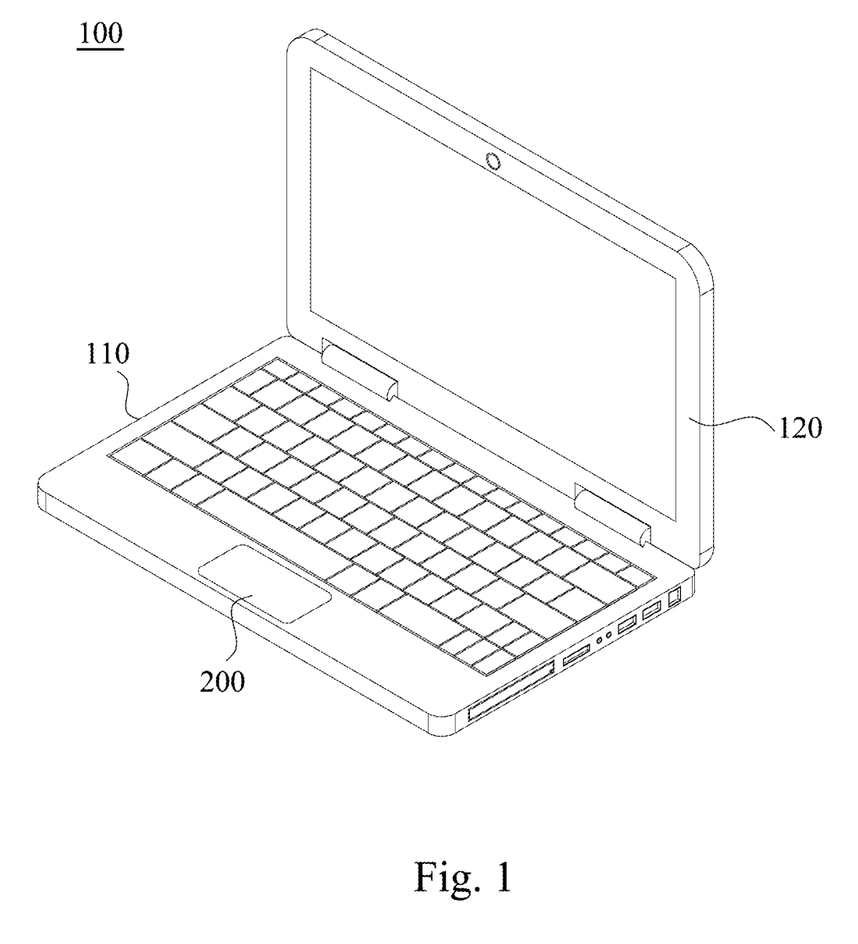
FIG. 1 is a perspective view of an electronic device according to an embodiment of the disclosure.

Reference is made to FIG. 1. FIG. 1 is a perspective view of an electronic device 100 according to an embodiment of the disclosure. As shown in FIG. 1, in the present embodiment, the electronic device 100 includes a host 110, a display 120, and an illuminated trackpad 200. The illuminated trackpad 200 is an input device disposed on the host 110, but the present disclosure is not limited thereto. In practical applications, the illuminated trackpad 200 can also be the other electronic product (e.g., a personal digital assistant, a keyboard including a trackpad, etc.). That is, concepts of the illuminated trackpad 200 of the present disclosure may be applied to any electronic product using a trackpad as an input or operation interface. The structures and functions of some elements included in the illuminated trackpad 200 and the connections and operation relationships among these elements will be described in detail below.

Figure 2:
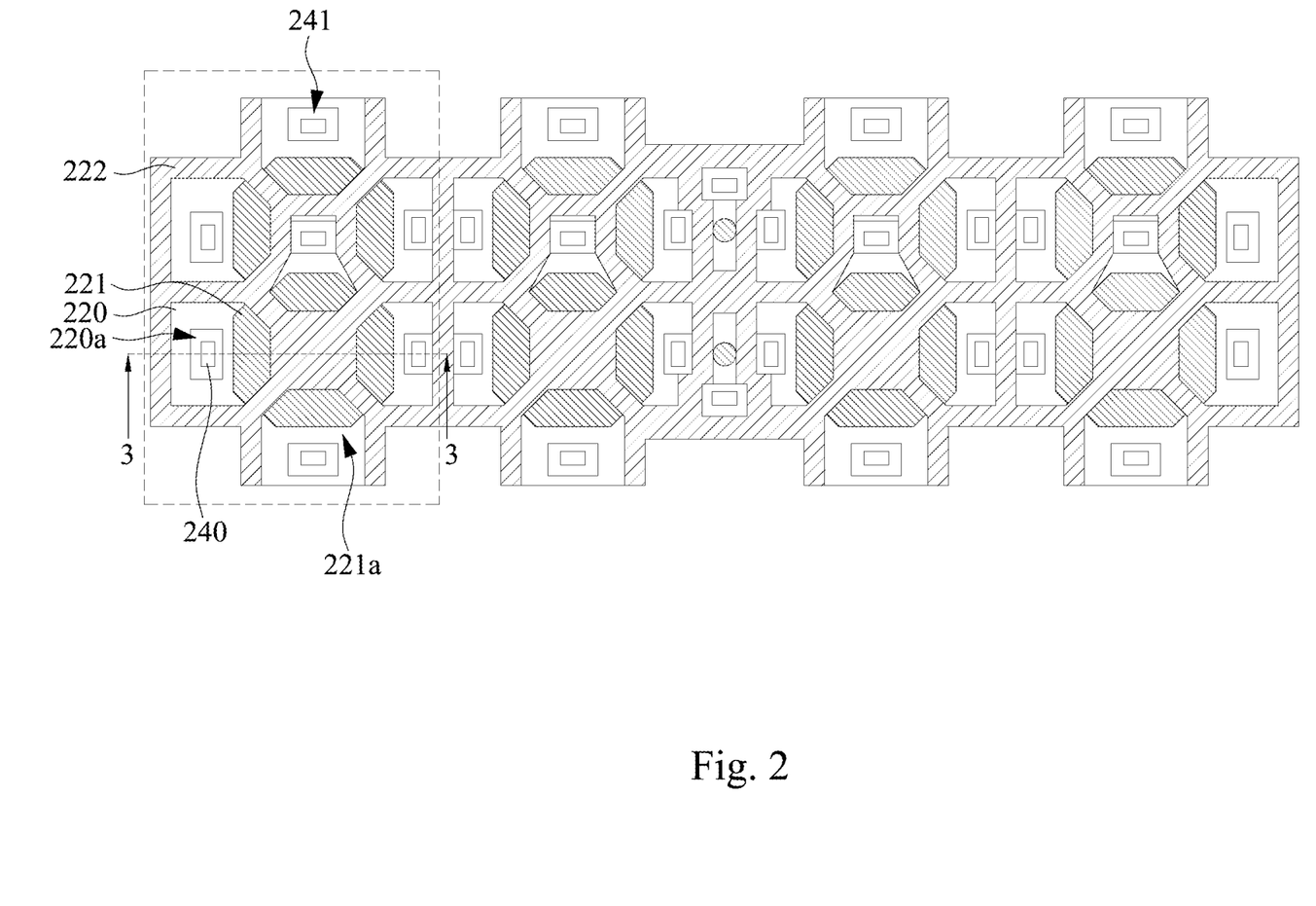
FIG. 2 is a partial top view of some components of an illuminated trackpad according to an embodiment of the disclosure.
Figure 3:
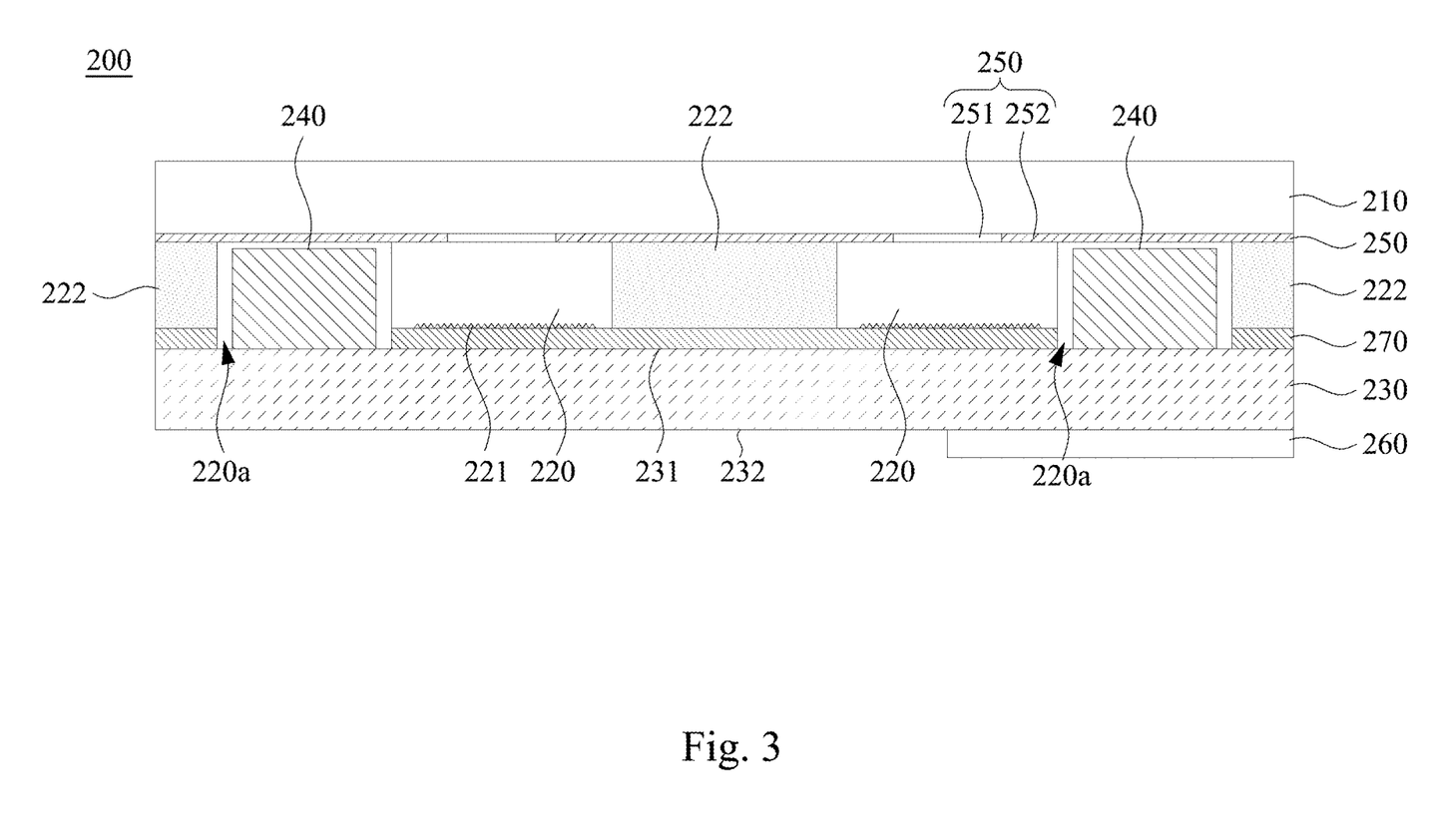
FIG. 3 is a partial cross-sectional view of the illuminated trackpad in FIG. 2 taken along line 3-3.

Reference is made to FIGS. 2 and 3. FIG. 2 is a partial top view of some components of the illuminated trackpad 200 according to an embodiment of the disclosure. FIG. 3 is a partial cross-sectional view of the illuminated trackpad 200 in FIG. 2 taken along line 3-3. As shown in FIGS. 2 and 3, in the present embodiment, the illuminated trackpad 200 includes a substrate 210, a light guide plate 220, a circuit board 230, a plurality of light-emitting elements 240, and a reflective sheet 270. The light guide plate 220 is disposed under the substrate 210 and includes a plurality of light guide units 221 and a plurality of through holes 220a. Each of the light guide units 221 is composed of a plurality of light guide microstructures, as shown in FIG. 3. Each of the light guide units 221 is substantially in shape of a strip or a line, as shown in FIG. 2. The through holes 220a are respectively arranged on one side of the light guide units 221. That is, one side of each of the light guide units 221 is provided with a corresponding one of the through holes 220a. The circuit board 230 is disposed under the light guide plate 220. The light-emitting elements 240 are disposed on the circuit board 230 and respectively accommodated in the through holes 220a. That is, each of the through holes 220a is provided with a corresponding one of the light-emitting elements 240 therein. The reflective sheet 270 is disposed between the circuit board 230 and the light guide plate 220. The reflective sheet 270 is configured to reflect the light exiting from the bottom surface of the light guide plate 220 back into the light guide plate 220. After lights emitted by the light-emitting elements 240 enter the light guide plate 220 through inner walls of the through holes 220a, the lights are guided upward through the light guide units 221 to pass through the substrate 210 and exit.

As shown in FIG. 3, in the present embodiment, the illuminated trackpad 200 further includes a light-shielding layer 250 that is opaque. The light-shielding layer 250 is disposed between the substrate 210 and the light guide plate 220. The light-shielding layer 250 has a plurality of light-transmitting regions 251 and at least one non-light-transmitting region 252. The light-transmitting regions 251 are disposed corresponding to the light guide units 221, respectively. The at least one non-light-transmitting region 252 is disposed corresponding to the light-emitting elements 240. In this way, the lights emitted by the light-emitting elements 240 can be prevented from directly passing through the substrate 210 to exit upward, and it is ensured that the lights emitted by the light-emitting elements 240 are guided upward by the light guide units 221 to pass through the substrate 210 and exit after reaching the light guide units 221.

Figure 4:
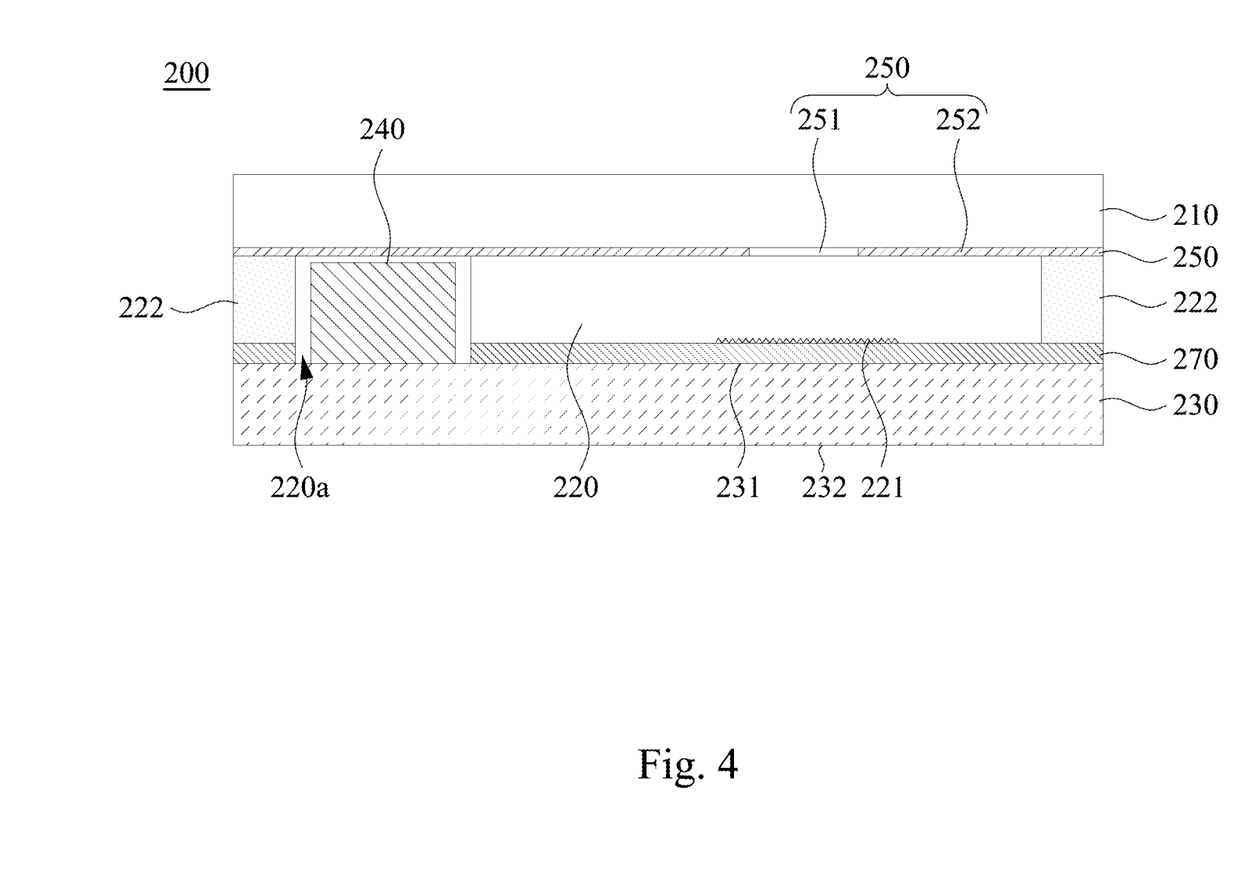
FIG. 4 is a partial cross-sectional view of an illuminated trackpad according to another embodiment of the disclosure.

Reference is made to FIG. 4. FIG. 4 is a partial cross-sectional view of an illuminated trackpad 200 according to another embodiment of the disclosure. As shown in FIG. 4, in the present embodiment, an area of the light-transmitting region 251 of the light-shielding layer 250 is smaller than an area of the light guide unit 221, and a vertical projection of the light-transmitting region 251 projected on the light guide unit 221 is located within an edge of the light guide unit 221. Therefore, the visible graphic finally presented by the lights emitted by the light-emitting elements 240 is defined by the outline of the light-transmitting region 251, and the visible graphic has sharp edges.

Figure 5:
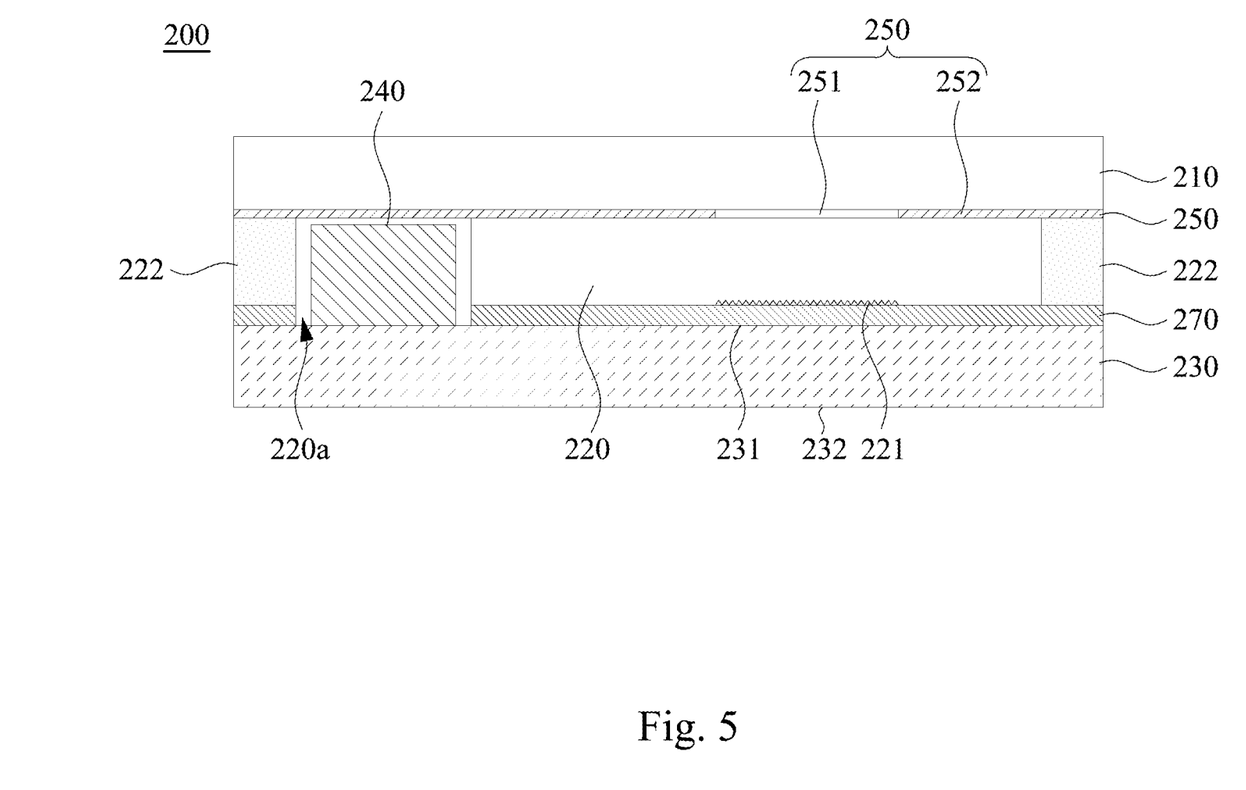
FIG. 5 is a partial cross-sectional view of an illuminated trackpad according to another embodiment of the disclosure.

Reference is made to FIG. 5. FIG. 5 is a partial cross-sectional view of an illuminated trackpad 200 according to another embodiment of the disclosure. As shown in FIG. 5, in the present embodiment, an area of the light-transmitting region 251 of the light-shielding layer 250 is identical to an area of the light guide unit 221, and a vertical projection of an edge of the light-transmitting region 251 projected on the light guide unit 221 is aligned with an edge of the light guide unit 221. The visible graphic finally presented by the lights emitted by the light-emitting elements 240 is also defined by the outline of the light-transmitting region 251, and the visible graphic has sharp edges.

Figure 6:
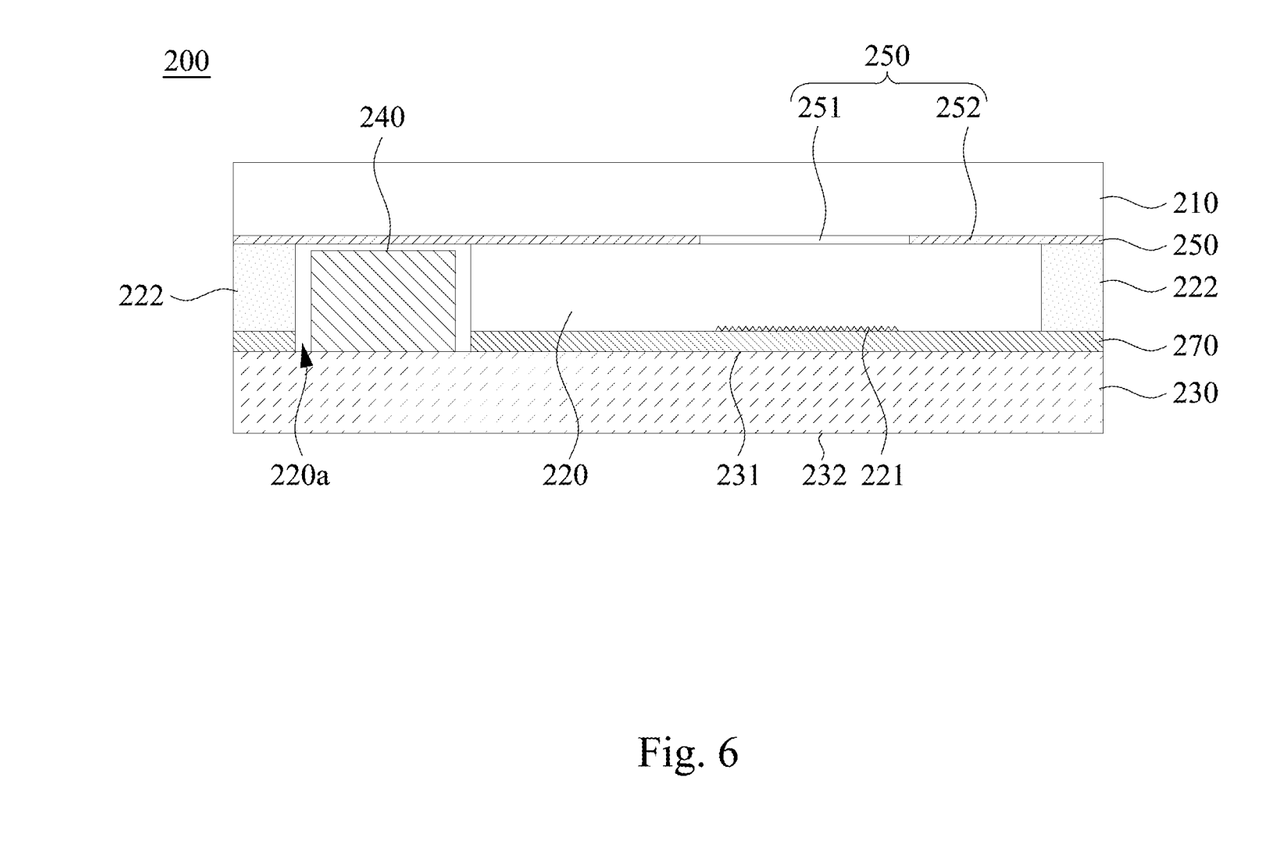
FIG. 6 is a partial cross-sectional view of an illuminated trackpad according to another embodiment of the disclosure.

Reference is made to FIG. 6. FIG. 6 is a partial cross-sectional view of an illuminated trackpad 200 according to another embodiment of the disclosure. As shown in FIG. 6, in the present embodiment, an area of the light-transmitting region 251 of the light-shielding layer 250 is greater than an area of the light guide unit 221, and a vertical projection of the light-transmitting region 251 projected on the light guide unit 221 completely covers an edge of the light guide unit 221. Therefore, the visible graphic finally presented by the lights emitted by the light-emitting elements 240 is defined by the outline of the light-transmitting region 251, and the visible graphic has a halo effect. In this way, two adjacent visual graphics can achieve a seamless visual effect.

In some embodiments, a material of the light-shielding layer 250 includes plastic, but the present disclosure is not limited thereto. In other embodiments, the light-shielding layer 250 is an opaque coating, but the present disclosure is not limited thereto.

In some embodiments, a material of the substrate 210 may include glass or Mylar, but the present disclosure is not limited thereto.

As shown in FIG. 3, in the present embodiment, a light blocking structure 222 is further disposed in the light guide plate 220 and between any adjacent two of the through holes 220a. In this way, it can be ensured that the light emitted by the light-emitting element 240 in each of the through holes 220a only reaches a corresponding one of the light guide unit 221, thereby effectively avoiding light interference between different light-emitting elements 240.

In some embodiments, as shown in FIG. 3, the light blocking structure 222 is a laser engraving structure. Specifically, by focusing a laser of a certain wavelength on the inside of the light guide plate 220, a specific portion of the inside of the light guide plate 220 can be slightly burst to form bubbles, which is a laser engraving structure. The laser engraving structure can block the light emitted by the light-emitting element 240 and make it unable to continue to transmit in the light guide plate 220.

Figure 7:
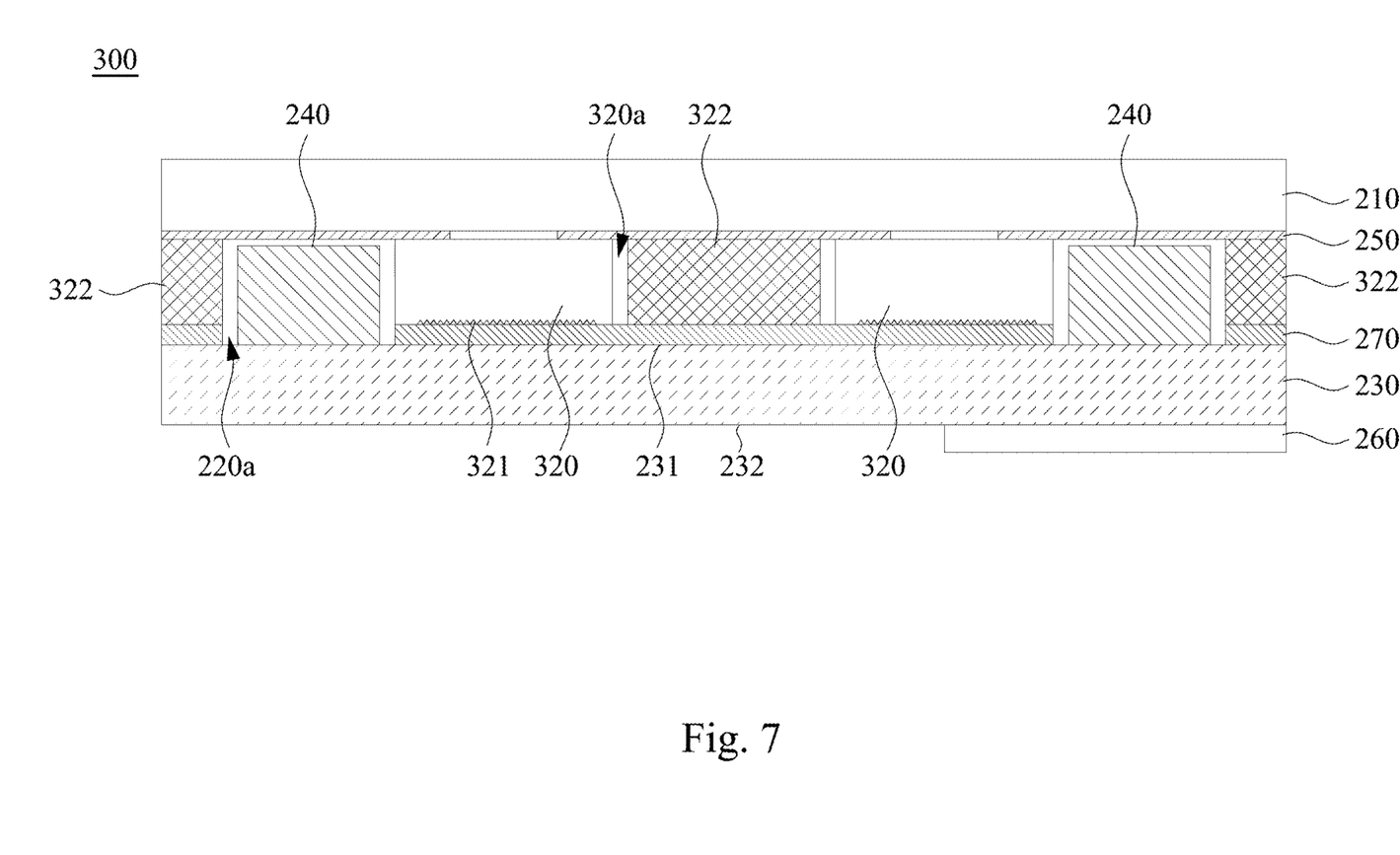
FIG. 7 is a partial cross-sectional view of an illuminated trackpad according to another embodiment of the disclosure.

Reference is made to FIG. 7. FIG. 7 is a partial cross-sectional view of an illuminated trackpad 300 according to another embodiment of the disclosure. In the present embodiment, a modified light guide plate 320 is provided, and a blocking wall 322 that is opaque is additionally provided. The other components of the present embodiment are the same as those of the embodiment shown in FIG. 3, and therefore are not repeated here.

Specifically, in the present embodiment, a blocking wall 322 that is opaque is between any adjacent two of the light-emitting elements 240. The light guide plate 320 further includes an accommodating groove 320a. The blocking wall 322 is accommodated in the accommodating groove 320a. In this way, it can also be ensured that the light emitted by each of the light-emitting elements 240 only reaches a corresponding one of the light guide unit 321, thereby effectively avoiding light interference between different light-emitting elements 240. In other words, in the present embodiment, the blocking wall 322 in the accommodating groove 320a is used to replace the light blocking structure 222 located inside the light guide plate 220 shown in FIG. 3.

As shown in FIG. 2, in the present embodiment, any adjacent two of the light guide units 221 are separated from each other. The light guide units 221 in the dotted frame form an outer frame substantially presenting a light guide graphic with a rectangular top portion (i.e., four light guide units 221) and a U-shaped bottom portion (i.e., three light guide units 221). In FIG. 2, there are three other similar light guide graphics. A number of the light guide units 221 included in the light guide graphic is seven (i.e., seven-segment display blocks). The seven light-emitting elements 240 in the dotted frame form a light-emitting element group 241. The light-emitting elements 240 in the light-emitting element group 241 respectively correspond to the light guide units 221 in the light guide graphic.

By controlling each of the light-emitting elements 240 of the light-emitting element group 241 in FIG. 2 to emit light or not to emit light, the light guide graphic can present a number. The number includes 0 to 9.

Figure 8:
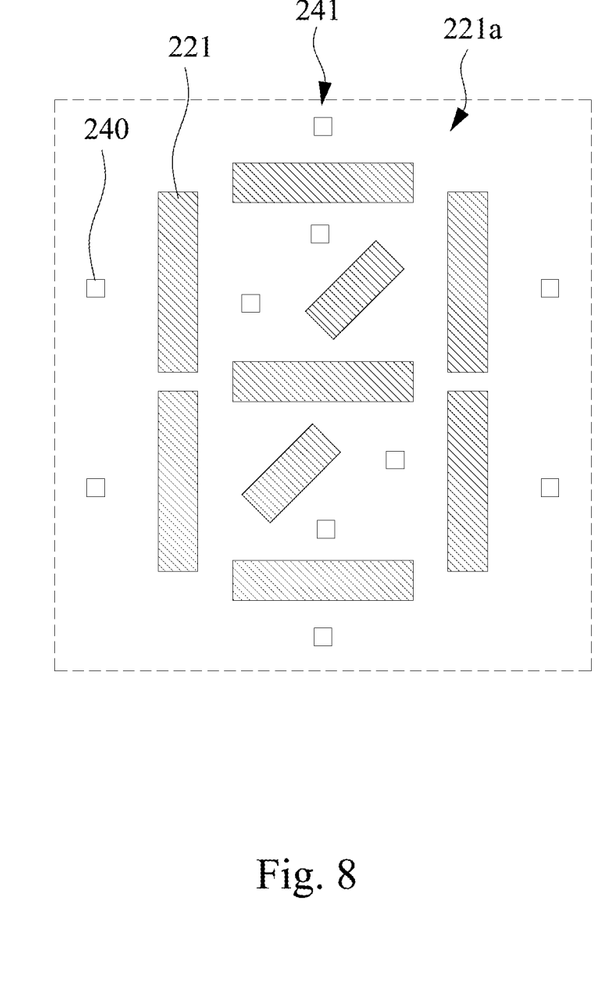
FIG. 8 is a schematic diagram of a light-emitting element group and a light guide graphic according to another embodiment of the disclosure.
Figure 9:
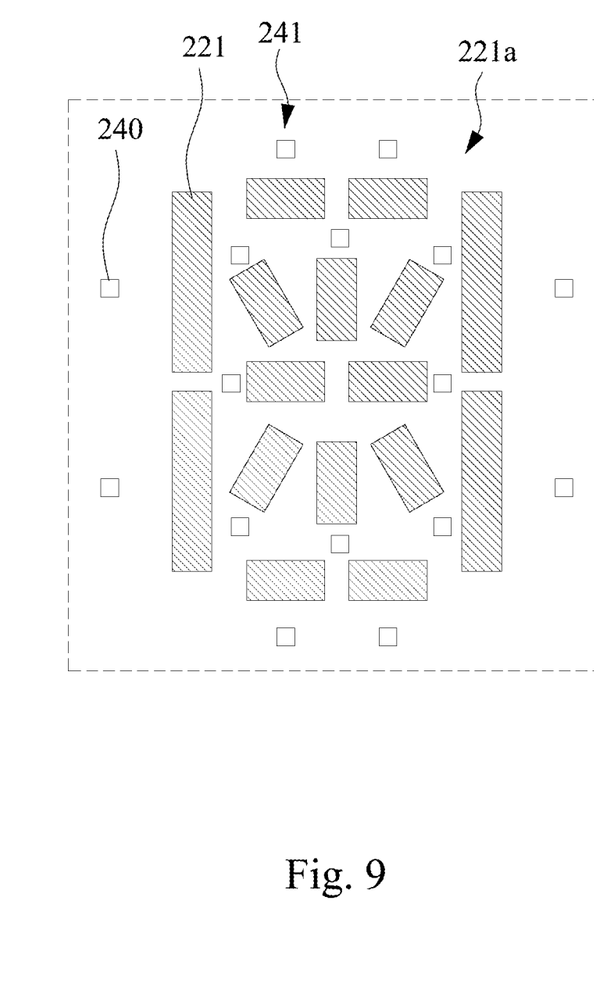
FIG. 9 is a schematic diagram of a light-emitting element group and a light guide graphic according to another embodiment of the disclosure.

Reference is made to FIGS. 8 and 9. FIG. 8 is a schematic diagram of a light-emitting element group 241 and a light guide graphic according to another embodiment of the disclosure. FIG. 9 is a schematic diagram of a light-emitting element group 241 and a light guide graphic according to another embodiment of the disclosure. In the embodiment shown in FIG. 8, the number of light guide units 221 included in the light guide graphic in the dotted frame is nine (i.e., nine-segment display blocks). In the embodiment shown in FIG. 9, the number of light guide units 221 included in the light guide graphic in the dotted frame is sixteen (i.e., sixteen-segment display blocks). The light-emitting elements 240 in the light-emitting element group 241 respectively correspond to the light guide units 221 in the light guide graphic.

By controlling each of the light-emitting elements 240 of the light-emitting element groups 241 in FIGS. 8 and 9 to emit light or not to emit light, in addition to numbers, English letters can also be presented by the light guide graphics. The English letters include at least one of A to Z.

Figure 10:
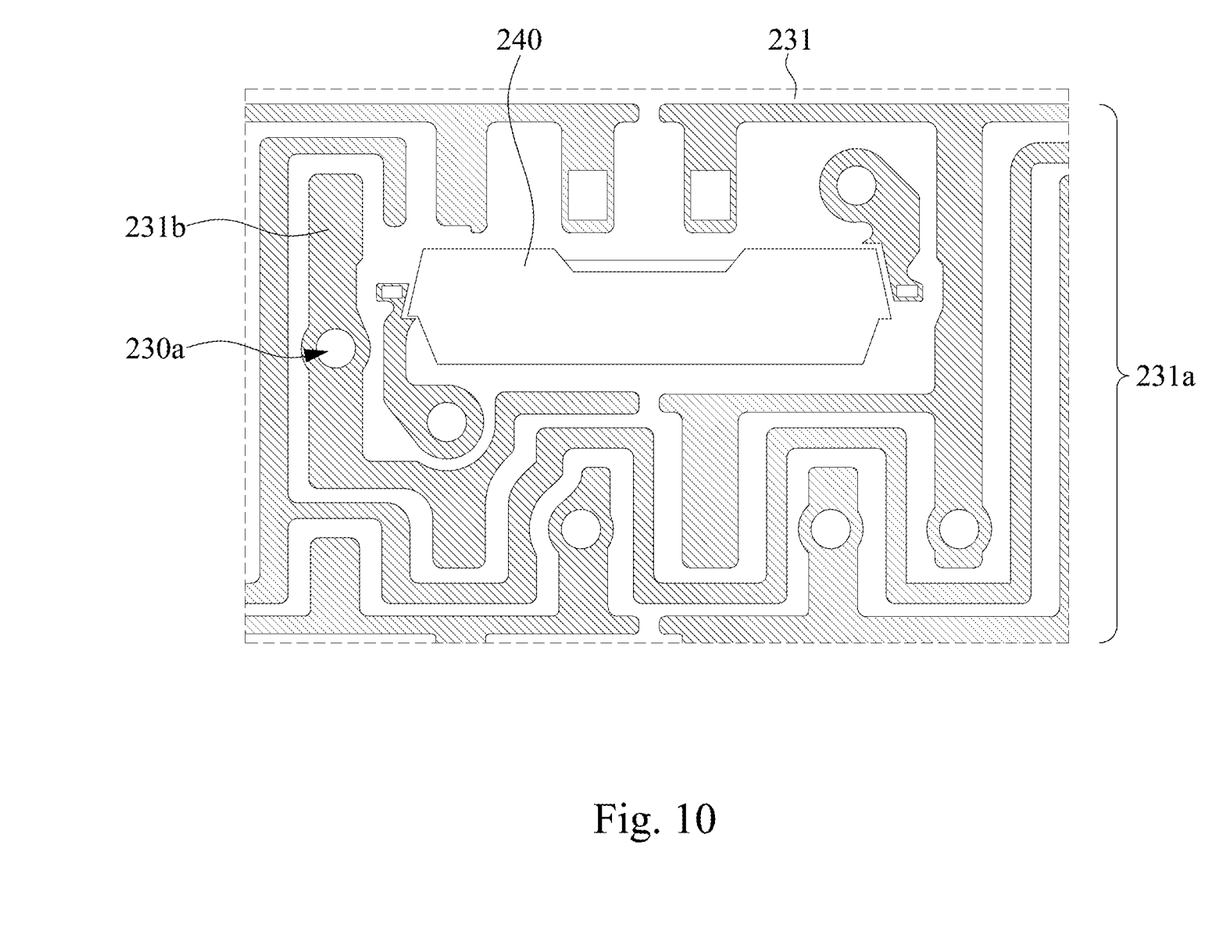
FIG. 10 is a partial top view of some components of the illuminated trackpad in FIG. 2.

Reference is made to FIG. 10. FIG. 10 is a partial top view of some components of the illuminated trackpad 200 in FIG. 2. As shown in FIGS. 2, 3, and 10, in the present embodiment, the circuit board 230 has a touch surface 231 and a non-touch surface 232. The touch surface 231 has a touch area 231a. A plurality of sensing electrodes 231b are disposed on the touch area 231a. The sensing electrodes 231b are distributed on the touch area 231a in a matrix form, so that the sensing electrodes 231b correspond to independent coordinates respectively. The light-emitting elements 240 are disposed in the touch area 231a. Each of the light-emitting elements 240 is disposed among the sensing electrodes 231b. Each of the light-emitting elements 240 and each of the sensing electrodes 231b are spaced apart by a distance. A controller 260 is disposed on a surface of the circuit board 230. The circuit board 230 has a plurality of via holes 230a. The sensing electrodes 231b on the touch area 231a are electrically connected to a controller on the non-touch surface 232 through the via holes 230a. The controller 260 is configured to receive touch signals sensed by the sensing electrodes 231b.

In some embodiments, the controller 260 is configured to generate a signal for controlling each of the light-emitting elements 240 in the light-emitting element group 241 to emit light or not to emit light, so that the light guide graphic presents a number and/or an English letter.

In some embodiments, the controller 260 is further configured to sense a touch input through the sensing electrodes 231b, and configured to change the number presented by the light guide graphic in response to the touch input moving from a first position to a second position on the touch area. For example, the first position and the second position are the lower left corner and the upper left corner of the touch area 231a, respectively. When the touch input moves from the first position to the second position, the controller 260 generates signals that can sequentially change the number displayed by the light guide graphic from 1 to 9. When the touch input moves from the second position to the first position, the controller 260 generates signals that can sequentially change the number displayed by the light guide graphic from 9 to 1.

In some embodiments, the controller 260 is further configured to sense a touch input through the sensing electrodes 231b, and configured to change the English letter presented by the light guide graphic in response to the touch input moving from a first position to a second position on the touch area. For example, the first position and the second position are the lower left corner and the lower right corner of the touch area 231a, respectively. When the touch input moves from the first position to the second position, the controller 260 generates signals that can sequentially change the English letter displayed by the light guide graphic from A to Z. When the touch input moves from the second position to the first position, the controller 260 generates signals that can sequentially change the English letter displayed by the light guide graphic from Z to A.

In some embodiments, the controller 260 is further configured to sense a touch input through the sensing electrodes 231b, and configured to change a brightness of the light emitted by at least one of the light-emitting elements 240 in response to the touch input moving from a first position to a second position on the touch area. For example, the first position and the second position are the upper left corner and the upper right corner of the touch area 231a, respectively. When the touch input moves from the first position to the second position, the controller 260 generates signals that can gradually increase the brightness of each of the light-emitting elements 240 in the light-emitting element group 241. When the touch input moves from the second position to the first position, the controller 260 generates signals that can gradually decrease the brightness of each of the light-emitting elements 240 in the light-emitting element group 241.

In some embodiments, as shown in FIGS. 2, 8, and 9, the light guide units 221 in each dotted frame form a light guide unit group 221a, and each light guide unit group 221a can present a complete light guide graphic (i.e., a number or an English letter). When a sensing electrode 231b adjacent to any of the light guide units 221 in the light guide unit group 221a senses a touch signal, the controller 260 regards the touch signal as a click signal for the light guide unit group 221a. The controller 260 is further configured to generate the aforementioned signals in response to the subsequent touch input after receiving the click signal first. In this way, the user can individually change the light guide graphics of different light guide unit groups 221a.

In some embodiments, when the controller 260 continuously receives a plurality of click signals for the aforementioned light guide unit group 221a within a predetermined time period, the controller 260 can sequentially switch the control types of the aforementioned signals generated in response to the aforementioned touch input. For example, when the controller 260 only receives one click signal for the light guide unit group 221a within the predetermined time period, the controller 260 can generate a signal that makes the light guide graphic present a number in response to the subsequent touch input. When the controller 260 continuously receives two click signals for the light guide unit group 221a within the predetermined time period, the controller 260 can generate a signal that makes the light guide graphic present an English letter in response to the subsequent touch input. When the controller 260 continuously receives three click signals for the light guide unit group 221a within the predetermined time period, the controller 260 can generate a signal that change the brightness of each of the light-emitting elements 240 in the light-emitting element group 241 in response to the subsequent touch input.

In some embodiments, the aforementioned predetermined time period is 1 second, but the present disclosure is not limited thereto.

According to the foregoing recitations of the embodiments of the disclosure, it can be seen that in the illuminated trackpad of the present disclosure, one side of each of the light guide units of the light guide plate is provided with a corresponding through hole, and each of the through holes is provided with a corresponding light-emitting element therein. Therefore, the light emitted by each of the light-emitting elements can enter the light guide plate through the inner wall of the corresponding through hole, and then be guided upward by the corresponding light guide unit to pass through the substrate and exit. With this configuration, by individually controlling each of the light-emitting elements to emit light or not to emit light, the light guide graphic composed of the light guide units can present a variable pattern (e.g., different numbers or English letters). In addition, the illuminated trackpad of the present disclosure can also use the sensing electrodes disposed on the circuit board to sense the touch input of a user, and change the pattern or brightness of the light guide graphic according to the movement path of the touch input.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An illuminated trackpad, comprising:
   a substrate;
   a light guide plate disposed under the substrate and comprising a plurality of light guide units and a plurality of through holes, each of the light guide units being composed of a plurality of light guide microstructures and substantially in shape of a strip or a line, wherein the through holes are respectively arranged on one side of the light guide units;
   a circuit board disposed under the light guide plate, the circuit board having a touch surface and a non-touch surface, the touch surface having a touch area, a plurality of sensing electrodes being disposed on the touch area; and
   a plurality of light-emitting elements disposed on the circuit board and respectively accommodated in the through holes;
   wherein after lights emitted by the light-emitting elements enter the light guide plate through inner walls of the through holes, the lights are guided upward by the light guide units to pass through the substrate and exit.

2. The illuminated trackpad of claim 1, wherein each of the light-emitting elements is disposed among the sensing electrodes, and each of the light-emitting elements and each of the sensing electrodes are spaced apart by a distance.

3. The illuminated trackpad of claim 1, further comprising a light-shielding layer that is opaque, the light-shielding layer is disposed between the substrate and the light guide plate, the light-shielding layer has a plurality of light-transmitting regions, and the light-transmitting regions are disposed corresponding to the light guide units, respectively.

4. The illuminated trackpad of claim 3, wherein the light-shielding layer has at least one non-light-transmitting region, and the at least one non-light-transmitting region is disposed corresponding to the light-emitting elements.

5. The illuminated trackpad of claim 1, wherein a blocking wall that is opaque is between any adjacent two of the light-emitting elements.

6. The illuminated trackpad of claim 5, wherein the light guide plate further comprises an accommodating groove, and the blocking wall is accommodated in the accommodating groove.

7. The illuminated trackpad of claim 1, wherein a light blocking structure is further disposed in the light guide plate and between any adjacent two of the through holes.

8. The illuminated trackpad of claim 7, wherein the light blocking structure is a laser engraving structure.

9. The illuminated trackpad of claim 1, wherein any adjacent two of the light guide units are separated from each other.

10. The illuminated trackpad of claim 9, wherein the light guide units form an outer frame substantially presenting a light guide graphic with a rectangular top portion and a U-shaped bottom portion, wherein a number of the light guide units included in the light guide graphic is at least seven.

11. The illuminated trackpad of claim 10, wherein at least seven of the light-emitting elements form a light-emitting element group, and the light-emitting elements in the light-emitting element group respectively correspond to the light guide units in the light guide graphic.

12. The illuminated trackpad of claim 11, wherein the circuit board includes a controller, and the controller is configured to generate a signal for controlling each of the light-emitting elements in the light-emitting element group to emit light or not to emit light, so that the light guide graphic presents a number, and the number is one of 0 to 9.

13. The illuminated trackpad of claim 12, wherein the controller is further configured to sense a touch input through the sensing electrodes, and configured to change the number presented by the light guide graphic in response to the touch input moving from a first position to a second position on the touch area.

14. The illuminated trackpad of claim 11, wherein the circuit board includes a controller, and the controller is configured to generate a signal for controlling each of the light-emitting elements in the light-emitting element group to emit light or not to emit light, so that the light guide graphic presents an English letter, and the English letter is one of A to Z.

15. The illuminated trackpad of claim 14, wherein the controller is further configured to sense a touch input through the sensing electrodes, and configured to change the English letter presented by the light guide graphic in response to the touch input moving from a first position to a second position on the touch area.

16. The illuminated trackpad of claim 1, wherein the sensing electrodes are distributed on the touch area in a matrix form, so that the sensing electrodes correspond to independent coordinates respectively.

17. The illuminated trackpad of claim 1, wherein the sensing electrodes and the light-emitting elements are arranged in the touch area.

18. The illuminated trackpad of claim 1, wherein the circuit board has a plurality of via holes, and the sensing electrodes are electrically connected to a controller on the non-touch surface through the via holes.

19. The illuminated trackpad of claim 18, wherein the controller is further configured to sense a touch input through the sensing electrodes, and configured to change a brightness of the light emitted by at least one of the light-emitting elements in response to the touch input moving from a first position to a second position on the touch area.

* * * * *